United States Patent

Nessler

[15] 3,691,895
[45] Sept. 19, 1972

[54] PLAY-BY-CHORD SLIDE RULE

[72] Inventor: Charles A. Nessler, 5480 Youngridge Drive, Pittsburgh, Pa. 15236

[22] Filed: Dec. 1, 1970

[21] Appl. No.: 94,065

[52] U.S. Cl..................................84/471, 84/477 R
[51] Int. Cl..............................................G09b 15/02
[58] Field of Search........................84/470–473, 475, 84/477–483, 485

[56] References Cited

UNITED STATES PATENTS

| | | | |
|---|---|---|---|
| 2,497,364 | 2/1950 | Mayberry | 84/473 |
| 2,332,842 | 10/1943 | Champion | 84/473 |
| 2,452,748 | 11/1948 | Grosch | 84/473 |
| 2,807,183 | 9/1957 | Ney | 84/470 X |
| 2,832,252 | 4/1958 | Gabriel | 84/473 X |

FOREIGN PATENTS OR APPLICATIONS 250,644   2/1912   Germany.....................84/473

*Primary Examiner*—Richard B. Wilkinson
*Assistant Examiner*—John F. Gonzales
*Attorney*—Carothers & Carothers

[57] ABSTRACT

A chord slide rule for learning musical chords and how they relate to the scale, the device comprising at least one insert which is fitted into a slide having a keyboard imprinted thereon for alignment with triad chord indicia imprinted on the underlying inserts to show the different triad chords for each selected keynote. When more than one type of triad chord indicia is placed upon the same insert face, they are distinguished by color coding.

3 Claims, 6 Drawing Figures

PATENTED SEP 19 1972
3,691,895
SHEET 1 OF 3
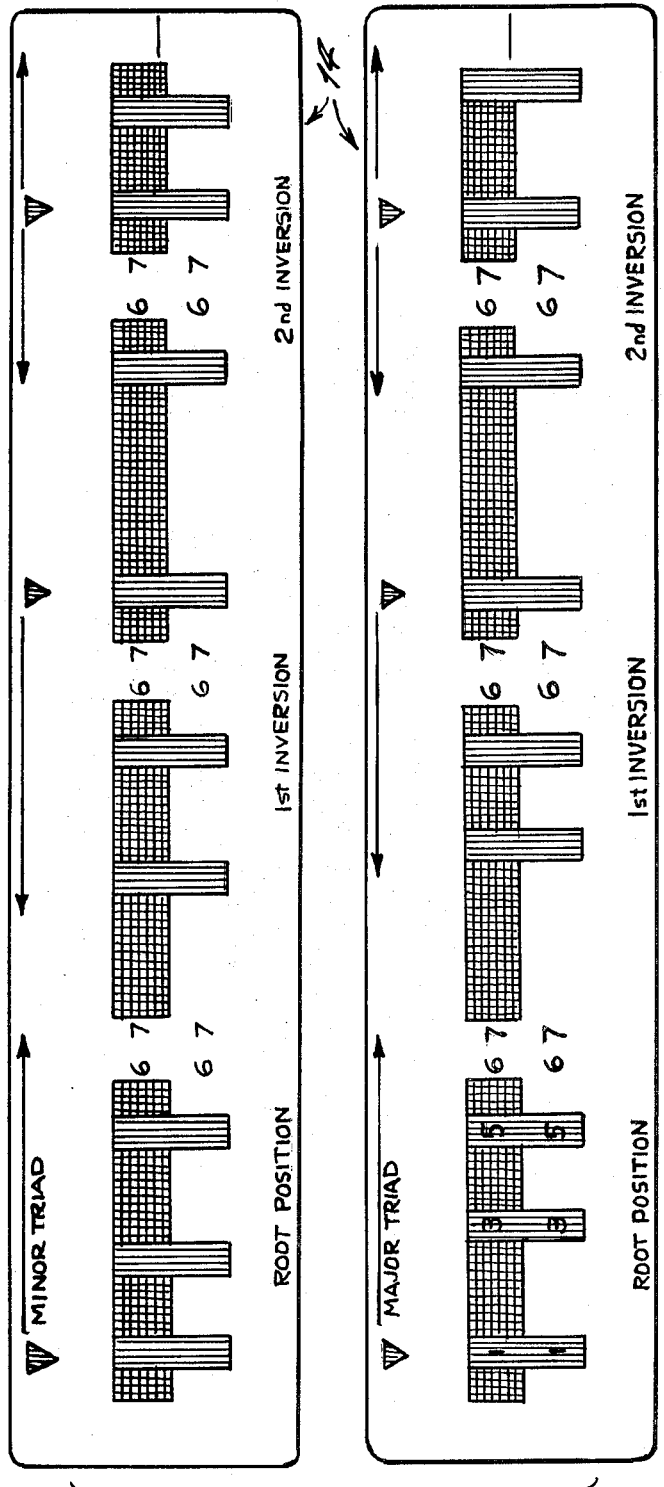
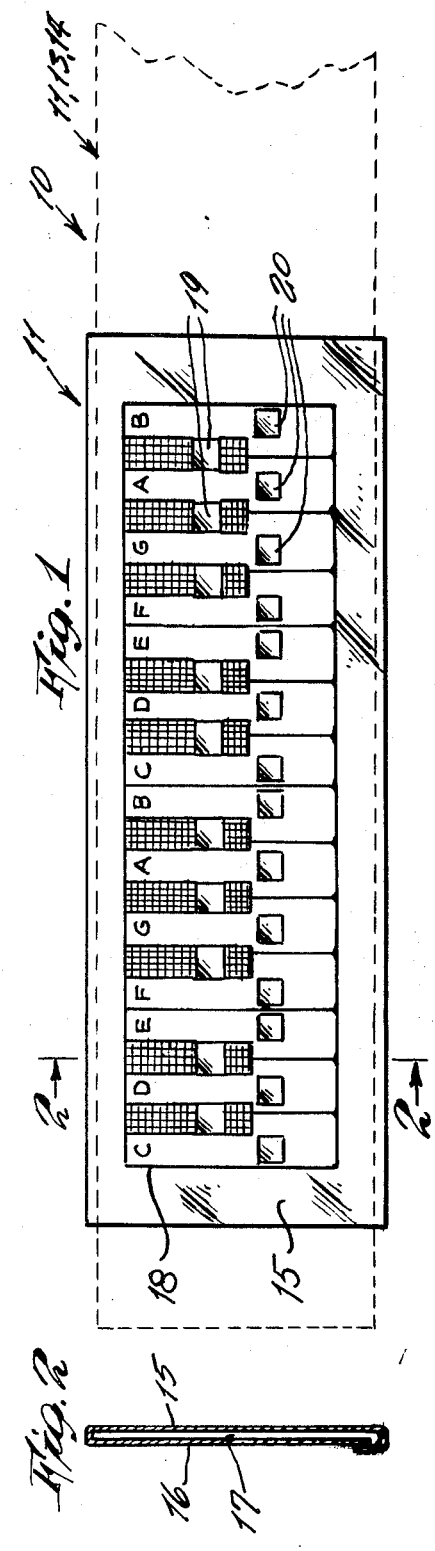
INVENTOR
CHARLES A. NESSLER

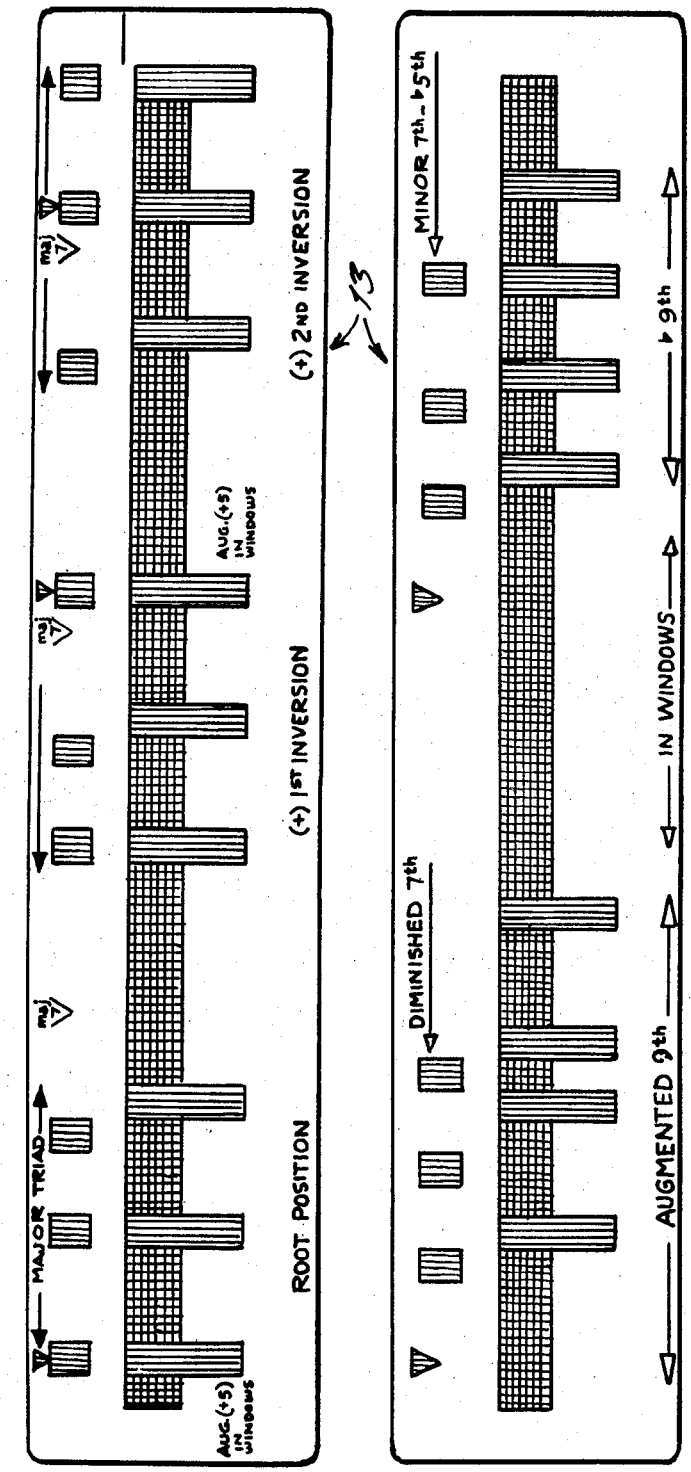

3,691,895

PLAY-BY-CHORD SLIDE RULE

SUMMARY OF THE INVENTION

This invention relates generally to slide rules and more particularly to music slide rules.

A principal object of the present invention is to provide a play-by-chord slide rule which teaches chords and how they relate to the music scale.

Another object of the present invention is to provide a play-by-chord slide rule which can be used for the spelling or playing of chords.

Another object of the present invention is to provide a play-by-chord slide rule which can be used for learning the music scales for different key notes.

Still another object of the present invention is to provide a play-by-chord slid rule which can be used to determine the I, IV, and V chords of he scale in any given key.

The slide rule comprises generally a slide member with at least one slide insertable therethrough and which together with the slide provide a means for teaching chords and how they relate to a scale. The outer slide member preferably has a keyboard imprinted thereon in black and white opaque ink and with predetermined areas thereupon being left unpainted to form transparent windows in order to permit one to see the insert indicia thereunder. This insert may bear syllable indicia which will show, for example, the major scale in chronological sequence through the windows for any given keynote which is preselected by prepositioning the slide or may show the different triad chords on the imprinted keyboard for any given key note which is preselected by positioning the slide to a predetermined coordination mark on the insert face.

Other objects of the present invention are to design, inexpensive to manufacture, rugged in construction, easy to use and efficient in operation.

Other objects and advantages appear hereinafter in the following description and claims.

The accompanying drawings show, for the purpose of exemplification without limiting the invention or the claims thereto, certain practical embodiments illustrating the principles of this invention wherein:

FIG. 1 is a view in front elevation of the slide member of the invention.

FIG. 2 is a cross-sectional view taken on line 2—2 of FIG. 1.

FIG. 3 is a front and rear view of one of the slide inserts.

FIG. 4 is a front and rear view of a second slide insert.

FIG. 5 is a front view of a third scale insert.

Figure 6:
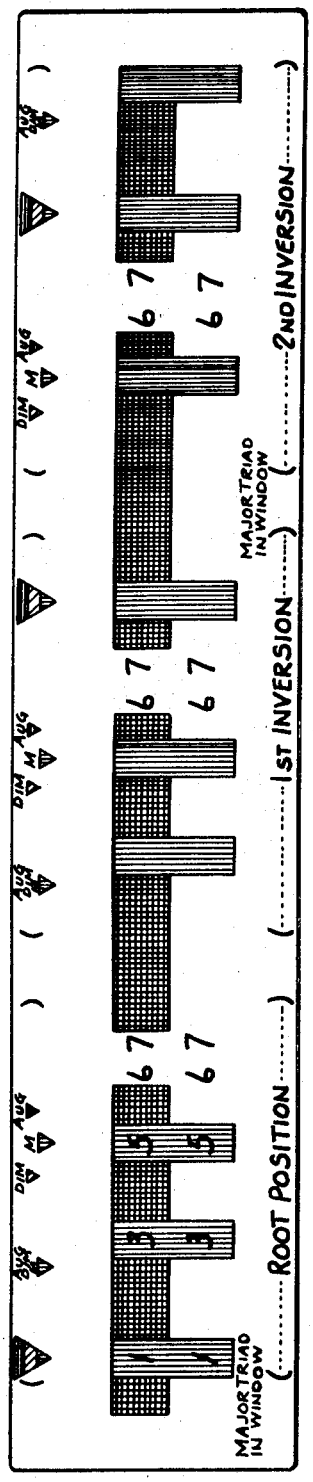
FIG. 6 is a front view of a triad chord insert bearing triad chord indicia of more than one type.

Referring now to the drawings in detail, the reference numeral 10 of FIG. 1 represents a play-by-chord slide rule according to the present invention wherein there is a keyboard slide member 11, a syllable insert 12 (FIG. 5), and major-minor triad inserts 13 and 14 (FIGS. 3 and 4).

The keyboard slide member 11 comprises a flat tubular member made of transparent plastic material and which includes flat upper and lower sides 15 and 16 respectively between which there is a flat central opening 17 through which the inserts are receivable, as shown in FIG. 1 of the drawing.

On the upper side 15 of the slide member 11, there in imprinted a keyboard 18 which is imprinted with opaque paint or ink so that it is not possible to see therethrough with exception of the areas 19 and 20 of small square shapes, which are left unpainted so that they form transparent windows so as to permit an observer to see therethrough and be able to observe any imprinted material or indicia made on the inserts in relation to the keyboard 18.

In the drawings, the color symbols indicate the kind of color utilized in imprinting the keyboard 18 as well as the imprinted material upon the inserts.

The syllable insert 12 is imprinted with text upon one side only as shown in FIG. 5, the rear side of the syllable insert being left blank. The major-minor triad inserts 13 and 14 are each imprinted upon both sides thereof, each of the FIGS. 3 and 4 accordingly illustrating the appearance of both sides of the inserts.

It is to be noted that the inserts 13 and 14 are imprinted in two different colors comprising red and black so that certain of the imprinting printed in black will blend with the black imprinting upon the keyboard slide whereas other imprinting in red upon the major-minor triad inserts will be readily visible within the windows 19 and 20 of the keyboard slide, as well as the numerical figures and other text.

The syllable slide 12 contains the diatonic scale with syllables of the major scale showing up in the transparent windows 19 and 20 of the slide to the different key positions.

In the clear area above the syllables, the I, IV and V chords of the scale noted in the windows of the slide when placed thereover are indicated. To the right of the scale information and to the left of the listed key flats, are listed common chord progressions.

The first of the major-minor triad inserts 14 (FIG. 3) contains major triads with the 6th and 7th indicated in the root, first inversion and second inversion of a chord.

The minor triad insert 14 (bottom of FIG. 3) is set up in a similar manner.

The other major-minor triad insert 13 (FIG. 4) contains the diminished and augmented chords such as the major 7th and augmented chords in three positions, diminished 7th minor 7th b 5th augmented 9th and b9th The "Play-by-Chord" slide r-le can be used for:
1. Spell or play chords
2. Learn scales
3. FIG. I, IV, and V chords in any given key.

By placing an insert into the plastic keyboard with the red pointer (▼) above the key note, red squares will appear in correct windows of the keyboard, or red squares will be noted above the keys, spelling the chords.

SYLLABLE INSERT

1. The syllable insert is slid into the plastic keyboard so that "Do" appears in the window of the first note of the scale, or the key note.

2. Syllables for the major scale will appear in the windows consecutively.

The Roman numerals above the keyboard will note the I, IV, and V chords of the scale noted in the windows.

The chart at the left notes the sharps and the chart at the right notes the flats found in each major scale. The chord progressions (at right) are those widely used to harmonize Popular tunes as indicated in the following table.

Common Chord Progressions

| | | | | | |
|---|---|---|---|---|---|
| I | IV | I | V | I | Hymn, Folk, Cowboy Tunes |
| I | I⁷ | IV⁷ | I | V⁷ I | Blues |
| I | VI | IV | V | I | Ballads |
| I | VI | II | V | I | Standard Popular Tunes |
| I | Vm | VI⁷ | II⁷ | I | Creates feeling of climax in Popular Song |
| I | II | V | I | | Swing Style |

The major-minor triad inserts are used as follows.

USING THE MAJOR-MINOR TRIAD INSERTS

1. The major triad insert in slid into the plastic keyboard with the red pointer over the key note or tonic wanted.
2. The red squares showing in the windows are then read. The triad will read 1–3–5.
3. The sixth of the chord will show as a red 6 in a white window.
4. The seventh of the chord will show as a red 7 in a white window.

EXAMPLE

To find at the upper left of insert 14 (bottom of FIG. 3) the C-chord in its root position, the red pointer is moved over to the first "C" of the keyboard. The windows are read showing 1–3–5. The root position of the C-chord will read C–E–G.

This chord is then placed on the piano in the same position noted by the insert. Adding the sixth will give the chord a richer sound. The seventh is used with the triad to construct a dominant or Barber Shop 7th in its root position.

The first inversion of the triad is read by placing the pointer (▼) in the inversion area on the second "C" of the keyboard. The red squares are then noted in the area encompassing the arrow adjacent the pointer.

The second red arrow in the 1st inversion area of insert 14 (bottom of FIG. 3) is placed over the second "C". The first inversion of the C-chord is then read as E–G–C. The inversion is then played with E as the lowest pitch.

The second inversion of the C-chord is read by placing the third red pointer (▼) in the 2nd inversion area on the root or key note in the second octave. The red squares are then noted in the area encompassing the arrows.

To find the second inversion of the C-chord, the 2nd inversion red arrow is placed on the "C" of the plastic keyboard. The notes showing red will read G–C–E. This inversion is then played with "G" as the lowest pitch. A or B-flat may be added to construct the 6th or 7th in C.

The minor triad insert (top of FIG. 3) is used in the same manner.

USING THE AUGMENTED AND DIMINISHED CHORD INSERT

The augmented and diminished chord insert is used to find:
1. Augmented triads in the root position and the 1st and 2nd inversion positions.
2. Augmented 9th chords.
3. Flatted 9th chords.

The red pointer of the desired position is positioned over the tonic or keynote of the desired chord. The notes showing as red squares in the windows are then read.

EXAMPLE

To find the augmented 9th chord in "C", the red pointer of that position (upper left corner, bottom of FIG. 4) is placed over the first note or key (on left) of the keyboard. The chord is then read as E–G ♯ –A ♯ –D. A red square will not appear in the C-window because the chord is usually played without the tonic or the "C".

To find:
1. Diminished 7th
2. Minor 7th and flatted 5th
3. Major triad in 6th - Major 7th added
   a. root position
   b. 1st inversion
   c. 2nd inversion, the pointer of the proper insert area is positioned over the key note or tonic and the red squares placed over or on top of the keyboard are read.

EXAMPLE

E-diminished 7th is noted by placing the corresponding red pointer over "E". The chord is then read as E–G–B flat - D flat.

Referring now to FIG. 6, insert 21 is illustrated wherein most of the information contained on both sides of inserts 13 and 14 is assimilated onto one insert surface thereby conserving space and consequently cost of manufacture and also illiminating the necessity of referring to more than one slide insert for all the desired chord information.

As with the major triad insert as shown in the bottom of FIG. 3, insert 21 indicates the major triad chords in the identical manner. The major triads will appear in the windows 19 and 20 for each key note selected The key notes are selected in the same manner as before whereby the selected key note on the keyboard slide is positioned until it falls immediately below the pointer. In this case, the pointer is multicolor and comprises the colors blue, green and red.

The minor, diminished and augmented chords are all indicated at the upper portion of the slide insert 21 In order to distinguish between these different chord variations, they are color coded.

The minor chord positions are indicated by the small red triangles or pointers and the small letter "m's" which are printed in red and appear directly thereabove. The red portion of the multicolor pointer also indicates that the key note directly under the pointer is also to be played in addition to the other position indicated. This is naturally true for all of the chords indicated; i.e. that the key note is always played.

The diminished chords are indicated in green and the augmented chords are indicated in blue.

Thus for the diminished chord positions, an area of green or the initials Dim in green will indicated the variations from the major triad shown in the windows 19 and 20 in order to play the diminished chord of the particular key selected.

Likewise, each of the augmented triad positions is indicated either by a blue pointer or pointer portion, such as the blue portion of the multicolor pointer, or by the initial Aug which are printed in blue. Thus, by the color distinctions one may very quickly determine how the major triad is varied in order to obtain the minor triad, diminished triad or augmented triad chords.

In essence, the operation is therefore substantially identical to that as previously described in conjunction with a plurality of inserts except that the information has been consolidated for convenience and costs sake. Furthermore, the reverse side of the insert shown in FIG. 6 may be provided with the syllable information shown on the insert of FIG. 5 thereby reducing the entire inventive combination to one slide member 11 and one insert 21.

I claim: 1. A play-by-chord slide rule comprising a slide member of transparent sheet plastic having a flat upper wall and top and bottom folds to receive a slide insert therebetween, a slide insert received for sliding engagement in said slide member between said top and bottom folds, a piano keyboard imprinted on said upper wall in black and white to form black and white piano keys with a predetermined area upon each of said keys being left unpainted to form transparent windows to see said slide insert therethrough, letter indicia on said upper wall designating the note for selected keys on said imprinted keyboard, a first set of colored areas imprinted at three different laterally spaced predetermined positions on the upper face of said slide insert within a first octave of said keyboard to indicate the major triad chord root positions through said windows for selected keys, a second set of colored areas imprinted on said upper face of said slide insert at three different laterally spaced predetermined positions within a second octave span of said keyboard positioned adjacent said first octave span on said slide insert to indicate chord inversions through said windows for selected keys, and minor triad indicia on said upper face of said slide insert positioned such that it is always visible through said upper transparent wall of said slide member and positioned at predetermined positions relative to said first and second set of color areas to indicate root position and inversion chord changes from the major triad required to obtain the corresponding minor triad chord.

2. The play-by-chord slide rule of claim 1 wherein diminished triad indicia is displayed on said upper face of said slide insert and positioned such that it is always visible through said upper transparent wall of said slide member and positioned at predetermined position relative to said first and second set of colored areas to indicate the required root position and inversion chord changes from the major triad required to obtain the corresponding diminished triad chord.

3. The play-by-chord slide rule of claim 1 wherein augmented triad indicia is displayed on said upper face of said slide insert and positioned such that it is always visible through said upper transparent wall of said slide member and positioned at predetermined positions relative to said first and second set of color areas to indicate the required root position and inversion chord changes from the major triad required to obtain the corresponding augmented triad chord.

* * * * *